United States Patent
Shiells et al.

(10) Patent No.: US 12,505,911 B2
(45) Date of Patent: Dec. 23, 2025

(54) ADAPTIVE NEUROLOGICAL TESTING METHOD

(71) Applicant: Genting TauRx Diagnostic Centre SDN BHD, Kuala Lumpur (MY)

(72) Inventors: Helen Christine Shiells, Aberdeen (GB); Suzannah Marie Morson, Aberdeen (GB); Björn Olaf Schelter, Aberdeen (GB); Damon Jude Wischik, Cambridge (GB); Claude Michel Wischik, Aberdeen (GB)

(73) Assignee: Genting TauRx Diagnostic Centre SDN BHD, Kuala Lumpur (MY)

( * ) Notice: Subject to any disclaimer, the term of this patent is extended or adjusted under 35 U.S.C. 154(b) by 525 days.

(21) Appl. No.: 17/598,819

(22) PCT Filed: Apr. 6, 2020

(86) PCT No.: PCT/EP2020/059801
§ 371 (c)(1),
(2) Date: Sep. 27, 2021

(87) PCT Pub. No.: WO2020/207983
PCT Pub. Date: Oct. 15, 2020

(65) Prior Publication Data
US 2022/0172821 A1    Jun. 2, 2022

(30) Foreign Application Priority Data

Apr. 10, 2019    (MY) .......................... PI 2019001993

(51) Int. Cl.
*G16H 20/70*    (2018.01)
*A61B 5/00*    (2006.01)
(Continued)

(52) U.S. Cl.
CPC .............. *G16H 20/70* (2018.01); *A61B 5/165* (2013.01); *A61B 5/4088* (2013.01); *A61B 5/742* (2013.01); *A61B 5/7475* (2013.01); *G16H 50/30* (2018.01)

(58) Field of Classification Search
CPC ........ G16H 20/70; G16H 50/30; G16H 10/20; A61B 5/165; A61B 5/4088; A61B 5/742; A61B 5/7475; A61B 5/7275
See application file for complete search history.

(56) References Cited

U.S. PATENT DOCUMENTS 7,347,818 B2 * 3/2008 Simon ...................... A61B 5/16
128/920
2004/0167380 A1    8/2004 Simon
(Continued)

FOREIGN PATENT DOCUMENTS

| CN | 108351862 A | 7/2018 |
| JP | 2016-109981 A | 6/2016 |

(Continued)

OTHER PUBLICATIONS

A. Alberdi et al., "Smart Home-Based Prediction of Multidomain Symptoms Related to Alzheimer's Disease," in IEEE Journal of Biomedical and Health Informatics, vol. 22, No. 6, pp. 1720-1731, Nov. 2018, doi: 10.1109/JBHI.2018.2798062. (Year: 2018).*
(Continued)

*Primary Examiner* — Sun M Li
(74) *Attorney, Agent, or Firm* — Wolf, Greenfield & Sacks, P.C.

(57) ABSTRACT

A method, a computer implemented method, and a device, all for adaptively testing a subjects neurological state. The method comprising the steps of: administering one or more seed questions; obtaining one or more answer(s) to the one or more seed questions; calculating a score value of a latent subject trait from the answers to the one or more seed
(Continued)

questions; the method comprising an adaptive test loop, comprising: (a) selecting, based on the score value, one or more further questions from a bank of questions; (b) administering the one or more further questions to the subject; (c) updating the score value based on the answers to the one or more further questions; (d) determining whether a test completion criteria has been met; wherein the method repeats steps (a)-(d) in sequence until the test completion criteria has been met, and provides an output of the test based on the score value which is indicative of the subjects neurological state.

18 Claims, 12 Drawing Sheets

(51) Int. Cl.
*A61B 5/16* (2006.01)
*G16H 50/30* (2018.01)

(56) References Cited

U.S. PATENT DOCUMENTS

| | | | |
|---|---|---|---|
| 2006/0282306 A1* | 12/2006 | Thissen-Roe | G06Q 10/063112 705/7.14 |
| 2007/0265489 A1* | 11/2007 | Fowler | A61N 1/36082 600/12 |
| 2008/0208074 A1* | 8/2008 | Snyder | A61B 5/4094 600/545 |
| 2009/0074677 A1* | 3/2009 | Marx | G01N 33/6896 424/45 |
| 2011/0123100 A1* | 5/2011 | Carroll | G06N 5/01 382/238 |
| 2012/0143073 A1* | 6/2012 | Denyer | G16H 20/13 128/200.14 |
| 2017/0069216 A1 | 3/2017 | Vaughan et al. | |
| 2017/0309197 A1* | 10/2017 | Spiegel | G06Q 90/00 |
| 2018/0103885 A1* | 4/2018 | Wrenn | G16H 10/20 |
| 2019/0096513 A1* | 3/2019 | Chang | G16H 50/30 |
| 2019/0130077 A1* | 5/2019 | De | G16H 50/30 |
| 2020/0178876 A1* | 6/2020 | Lam | A61B 5/4803 |

FOREIGN PATENT DOCUMENTS

| | | | | |
|---|---|---|---|---|
| KR | 10-2018-0110012 A | | 10/2018 | |
| WO | WO-2016077372 A1 * | | 5/2016 | G06Q 90/00 |
| WO | WO 2017/146363 A1 | | 8/2017 | |

OTHER PUBLICATIONS

Battista P, Salvatore C, Castiglioni I. Optimizing Neuropsychological Assessments for Cognitive, Behavioral, and Functional Impairment Classification: A Machine Learning Study. Behav Neurol. 2017;2017:1850909. doi: 10.1155/2017/1850909. Epub Jan. 31, 2017. PMID: 28255200; PMCID: PMC5307249. (Year: 2017).*

Yan Cheng and Weisheng Xu, "A fast convergence Computerized Adaptive Testing system based on multi-agent system," 2008 7th World Congress on Intelligent Control and Automation, Chongqing, China, 2008, pp. 1460-1465, doi: 10.1109/WCICA.2008.4593137. (Year: 2008).*

International Search Report and Written Opinion for International Application No. PCT/EP2020/059801 mailed Jul. 17, 2020.

Derong et al., Research of CAT Model based on Mobile Agent Group. 2008 IEEE International Conference on Computer Science and Information Technology Aug. 29, 2008:393-96.

PCT/EP2020/059801, Jul. 17, 2020, International Search Report and Written Opinion.

Morris et al., Advancing the efficiency and efficacy of patient reported outcomes with multivariate computer adaptive testing. Journal of the American Medical Informatics Association. Sep. 1, 2017;24(5):897-902.

Leyhe et al., A common challenge in older adults: Classification, overlap, and therapy of depression and dementia. Alzheimer's & dementia. Jan. 1, 2017;13(1):59-71.

Mulder et al., Multidimensional adaptive testing with optimal design criteria for item selection. Psychometrika. Jun. 2009;74:273-96.

* cited by examiner

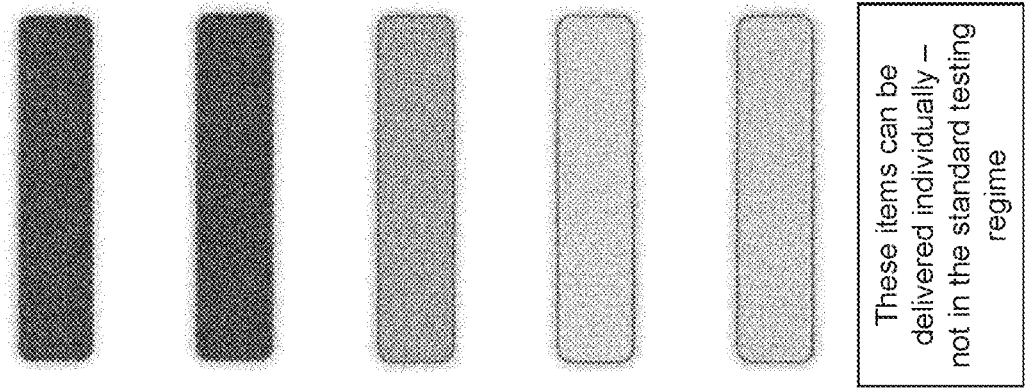
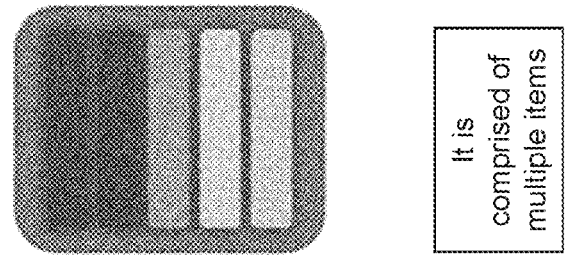
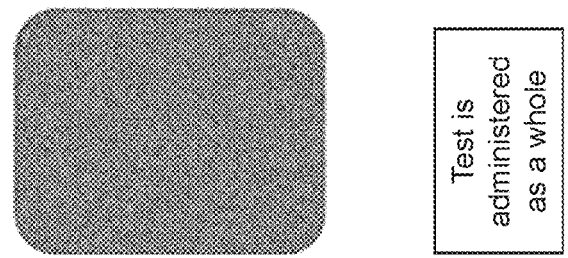
Fig. 1

ADAPTIVE NEUROLOGICAL TESTING METHOD

RELATED APPLICATIONS

This Application is a national stage filing under 35 U.S.C. § 371 of International Patent Application Serial No. PCT/EP2020/059801, filed Apr. 6, 2020, which claims priority to Malaysian application number PI 2019001993, filed Apr. 10, 2019.

FIELD OF THE INVENTION

The present invention relates to an adaptive method of testing a subject's mental performance.

BACKGROUND

The diagnosis of Alzheimer's disease, and the monitoring of a subject's mental capacity once diagnosed, is an active and multifaceted area of research. Alzheimer's disease is a neurological disease whereby excess protein builds up in the brain, impairing neuronal function and eventually leading to cell death. The disease is characterised by continual progression, but the rate of progression is individual. Being able to identify the early stages of Alzheimer's disease is useful, however a barrier to the early diagnosis of Alzheimer's disease is that significant damage to the brain has already occurred before the disease is detectable via conventional methods.

Opinions differ on the best way to diagnose and stratify patients with Alzheimer's disease. Popular examples include: genotyping; imaging techniques such as MRI or PET scanning; and gauging a patient's decline using industry standard neuropsychological assessments.

US2008/0118899 relates to the identification of individuals in the population who are at particular risk of Suffering from disorders associated with neurocognitive degeneration, such as Alzheimer's disease.

SUMMARY

The inventors have provided a novel neuropsychological assessment which is considered to be more robust and sensitive than previous assessments. The assessment utilizes item response theory (IRT)—also known as latent trait theory—in which questions or items in a generic test are related to an underlying and latent trait. The central concept of IRT is the relationship between the way a participant responds to a question and the latent trait of which that question is indicative.

In some aspects, the invention is concerned with an adaptive method of testing a subject's neurological state, where questions used in the test are selected based on a score obtained relating to one or more latent trait of the subject.

The positives of using neuropsychological testing for assessment of Dementia are considerable. The tests are non-invasive, relatively inexpensive and can be widely and, if necessary, repeatedly administered. However repeated testing, using the same questions, can result in a learning effect. Each test looks at a single symptom area, therefore multiple tests are needed to properly quantify the severity of Dementia, and each test must be completed in full as missing items invalidate a test, which leads to a long testing time. Therefore, a false proxy of the latent trait is possible due to practice or fatigue. The usage of each of these tests as a proxy for the severity of the Dementia of a patient fails to account for the fact that the typical battery of neuropsychological tests for Dementia patients explores many different areas of patient ability. It is feasible that each of these areas do not follow that same pattern of deficiency from patient to patient, but rather decline in such a way that are independent from each other. Current scoring of tests has been shown to be an inaccurate method of gaining insight into the ability of a patient as it does not take into account the varying difficulty of the questions within the test.

Accordingly, in a first aspect, the invention provides a method of adaptively testing a subject's neurological state, comprising the steps of: administering one or more seed questions; obtaining one or more answer(s) to the one or more seed questions; calculating a score value of a latent subject trait from the answers to the one or more seed questions; the method comprising an adaptive test loop comprising: (a) selecting, based on the score value, one or more further questions from a bank of questions; (b) administering the one or more further questions to the subject; (c) updating the score value based on the answers to the one or more further questions; and (d) determining whether a test completion criteria has been met; wherein the method repeats steps (a)-(d) in sequence until the test completion criteria has been met, and provides an output of the test based on the score value which is indicative of the subject's neurological state.

The method of the first aspect can maximise the information derivable from the questions, or items in industry standard neuropsychological tests, by considering them separately from the tests from which they originate; and assessing their difficulty with respect to multiple areas of patient ability. The method can be applied to assess the difficulty of items and the ability of subjects with respect to the many facets of patient decline. This provides a more sensitive approach to scoring patients as it allows for items to be a measure of more than one underlying, latent trait; explicitly accounting for the fact that decline is not uniform across patient groups. It also takes into account varying difficulty of items with respect to multiple underlying latent traits which contribute to patient decline.

The steps may be interspersed with one or more sub-steps and/or are not necessarily directly performed one after the other. In some examples, the steps are performed directly one after the other. Herein, item may refer to a question or exercise from one or more neuropsychological testing method. The neurological state being tested may be a determination as to whether the subject has Dementia or Alzheimer's disease.

Optional features of the invention will now be set out. These are applicable singly or in any combination with any aspect of the invention.

The methods of the invention may be for assessing, testing or classifying a subject's neurological state for any purpose. For example the score value or other output of the test may be used to classify the subject's mental state or disease state according to predefined criteria.

The subject may be any human subject. In one embodiment the subject may be one suspected of suffering a neurocognitive disease or disorder e.g. a neurodegenerative or vascular disease as described herein.

In one embodiment the method is for the purpose of diagnosing or prognosing a cognitive impairment, for example a neurocognitive disease, in the subject.

Here the underlying latent traits result from the neurodegeneration caused by the disease—for example one or more of a cognitive trait, a dementia trait, and a depression trait.

In one embodiment the disease is mild to moderate Alzheimer's Disease.

In one embodiment the disease is mild cognitive impairment.

In one embodiment the disease is a dementia—for example a vascular dementia.

In one embodiment the method is for the purpose of determining the risk of a neurocognitive disorder in the subject. Optionally said risk may additionally be calculated using further factors e.g. age, lifestyle factors, and other measured physical or mental criteria. Said risk may be a classification of "high" or "low" or may be presented as a scale or spectrum.

In one embodiment the method is for the purpose of monitoring the progress of neurocognitive disease in the subject diagnosed with the same. For example the method may be for the purpose of monitoring neurodegeneration or other cognitive or related decline in the subject.

The method may optionally include the steps of treating subjects diagnosed with a neurocognitive disease.

Thus the subject may be one receiving medication or other treatment for neurocognitive disease, in which case the method may be used for monitoring the effectiveness of the treatment e.g. in relation to improvement or reduced decline, for example compared to a placebo or other control.

In one embodiment the method is for recruiting subjects for a clinical trial, wherein the method is used to classify the subjects according to whether they meet trial recruitment criteria.

The score value may be a latent trait ability score. The latent trait ability score may be indicative of a subject's ability in one or more latent traits.

Each of the further questions may have an associated difficulty rating and an indication of relevancy to at least one of the one or more latent subject traits. The selection of the one or more further questions may further be based on one or both of the associated difficulty ratings and the indication of relevancy to one or more latent subject traits.

The method may calculate a score value for each of a plurality of latent subject traits from the answer(s) to the one or more seed questions, and selecting the further question(s) may be further based on at least one of these score values. In some examples, the method calculates a score value for each of three latent subject traits: a cognitive latent trait, a dementia latent trait, and a depression latent trait. The method may include an initial step of determining a weighting value for each of the plurality of latent subject traits. This weighting value may be binary, and so indicate whether a specific latent subject trait is to be investigated. Selecting one or more further questions may further be based on the weighting value for at least one of the plurality of latent subject traits.

The one or more latent subject traits may include one or more of: a cognitive trait, a dementia trait, and a depression trait.

The score for the or each latent subject trait may be calculated using an expectation maximisation algorithm and/or a generalised linear model. The generalised linear model may have the form: $Y_{i,q}$~Bernoulli($\alpha+\beta_q cog_i+\gamma_q dem_i+\delta_q dep_i$), where $Y_{i,q}$ is the response given by the subject at a particular visit i, q is the question, a is the intercept, $\beta_q$, $\gamma_q$, and $\delta_q$ are difficulty scores for the questions associated with the cognitive trait, dementia trait, and depression trait respectively, and $cog_i$, $dem_i$, and $dep_i$ are the subject ability score associated with the cognitive trait, dementia trait, and depression trait respectively.

The seed questions and/or the further questions may be selected from any one or more of the Alzheimer's Disease Assessment Scale-cognitive test (W. G. Rosen, R. C. Mohs, and K. L. Davis, A new rating scale for Alzheimer's disease. *American Journal of Psychiatry*, Vol. 141, 1984), the Alzheimer's Disease Cooperative Study—Activities of Daily Living test (D. Galasko, D. Bennett, M. Sano, C. Ernesto, R. Thomas, M. Grundman, and S. Ferris. An inventory to assess activities of daily living for clinical trials in Alzheimer's disease. *Alzheimer's Disease and Associated Disorders*, Vol. 11 (suppl. 2), 1997), the Neuropsychiatric Inventory test (J. L. Cummings, M. Mega, K. Gray, S. Rosenberg-Thompson, D. A. Carusi, and J. Gorbein. The Neuropsychiatric Inventory: Comprehensive assessment of psychopathology in dementia, *Neurology*, Vol. 44, 1994), the Montgomery-Asberg Depression Rating Scale test (S. A. Montgomery and M. Asberg. A new depression scale designed to be sensitive to change. *British Journal of Psychiatry*, Vol. 134, 1979), and the Mini-Mental State Examination test (M. F. Folstein, S. E. Folstein, P. R. McHugh. Mini-Mental State: A practical method for grading the cognitive state of patients for the clinician. *Journal of Psychiatric Research*, Vol. 12, 1975). As will be appreciated, essentially any question from any validated neuropsychological assessment (which has been appropriately characterised as discussed below) may be utilised in the adaptive testing method herein, or any question equivalent to such existing, validated neuropsychological assessments.

The seed questions and/or the further questions may be used to calculate and update a score value for each of a plurality of latent subject traits.

Selecting one or more further questions may further be based on an information content for each question in the database of questions. The information content for each of the questions in the database of questions may be calculated for the subject based on the score value of the latent subject trait, and one or more questions from the database of the questions with the highest information content may be selected.

In a second aspect, the invention provides a computer implemented method of adaptively testing a subject's neurological state, comprising the steps of: presenting one or more seed questions on a display; receiving answers to the one or more seed questions via an input device; calculating, by a processor, a score value of a latent subject trait from the received answers to the one or more seed questions; entering an adaptive test loop, comprising the steps of: (a) selecting, based on the score value, one or more further questions from a database of questions; (b) presenting the one or more further questions on the display; (c) updating the score value based on received answers to the one or more further questions; and (d) determining whether a test completion criteria has been met; wherein the computer implemented method repeats steps (a)-(d) in sequence until the test completion criteria has been met, and provides an output of the test based on the score value which is indicative of the subject's neurological state.

The steps may be interspersed with one or more sub-steps and/or are not necessarily directly performed one after the other. In some examples, the steps are performed directly one after the other. Herein, item may refer to a question or exercise from one or more neuropsychological testing methods. The neurological state being tested may be a determination as to whether the subject has Dementia or Alzheimer's disease.

Optional features of the invention will now be set out. These are applicable singly or in any combination with any aspect of the invention.

The score value may be a latent trait ability score. The latent trait ability score may be indicative of a subject's ability in one or more latent traits.

Each of the further questions may have an associated difficulty rating and an indication of relevancy to at least one of the one or more latent subject traits. The selection of the one or more further questions may further be based on one or both of the associated difficulty ratings and the indication of relevancy to one or more latent subject traits.

The method may calculate a score value for each of a plurality of latent subject traits from the answer(s) to the one or more seed questions, and selecting the further question(s) may be further based on at least one of these score values. In some examples, the method calculates a score value for each of three latent subject traits: a cognitive latent trait, a dementia latent trait, and a depression latent trait. The method may include an initial step of determining a weighting value for each of the plurality of latent subject traits. This weighting value may be binary, and so indicate whether a specific latent subject trait is to be investigated. Selecting one or more further questions may further be based on the weighting value for at least one of the plurality of latent subject traits.

The one or more latent subject traits may include one or more of: a cognitive trait, a dementia trait, and a depression trait.

The score for the or each latent subject trait may be calculated using an expectation maximisation algorithm and/or a generalised linear model. The generalised linear model may have the form: $Y_{i,q} \sim \text{Bernoulli}(\alpha + \beta_q \text{cog}_i + \gamma_q \text{dem}_i + \delta_q \text{dep}_i)$, where $Y_{i,q}$ is the response given by the subject at a particular visit i, q is the question, $\alpha$ is the intercept, $\beta_q$, $\gamma_q$, and $\delta_q$ are difficulty scores for the questions associated with the cognitive trait, dementia trait, and depression trait respectively, and $\text{cog}_i$, $\text{dem}_i$, and $\text{dep}_i$ are the subject ability score associated with the cognitive trait, dementia trait, and depression trait respectively.

The seed questions and/or the further questions may be selected from any one or more of the Alzheimer's Disease Assessment Scale-cognitive test (ADAS-cog), Alzheimer's Disease Cooperative Study—Activities of Daily Living test (ADL), Neuropsychiatric Inventory test (NPI), Montgomery-Asberg Depression Rating Scale test (MADRS), and the Mini-Mental State Examination test (MMSE). As will be appreciated, essentially any question from any validated neuropsychological assessment (which has been appropriately characterised as discussed below) may be utilised in the adaptive testing method herein.

The seed questions and/or the further questions may be used to calculate and update a score value for each of a plurality of latent subject traits.

Selecting one or more further questions may further be based on an information content for each question in the database of questions. The information content for each of the questions in the database of questions may be calculated for the subject based on the score value of the latent subject trait, and one or more questions from the database of questions with the highest information content may be selected.

In a third aspect, the invention provides a device for implementing an adaptive test of a subject's neurological state, comprising: a processor, a memory, a display, and an input device; wherein the memory contains processor executable instructions to perform the method of either of the first or second aspect.

In some embodiments, the device may be a portable and/or hand-held device. For example, the device may be a tablet PC, smartphone, or the like.

Further aspects of the present invention provide: a computer program comprising code which, when run on a computer, causes the computer to perform the method of the first aspect or the second aspect; a computer readable medium storing a computer program comprising code which, when run on a computer, causes the computer to perform the method of the first aspect or the second aspect; and a computer system programmed to perform the method of the first aspect or the second aspect.

BRIEF DESCRIPTION OF THE DRAWINGS

Embodiments of the invention will now be described by way of example with reference to the accompanying drawings in which:

FIG. 1 is a diagram demonstrating that conventional neuropsychological tests are consider as a single entity, but are nevertheless comprised of individual questions, or items, which can be asked independently of the conventional testing regime to yield information about the ability of a subject;

DETAILED DESCRIPTION AND FURTHER OPTIONAL FEATURES

Aspects and embodiments of the present invention will now be discussed with reference to the accompanying figures. Further aspects and embodiments will be apparent to those skilled in the art. All documents mentioned in this text are incorporated herein by reference.

Item Response Theory

Figure 2:
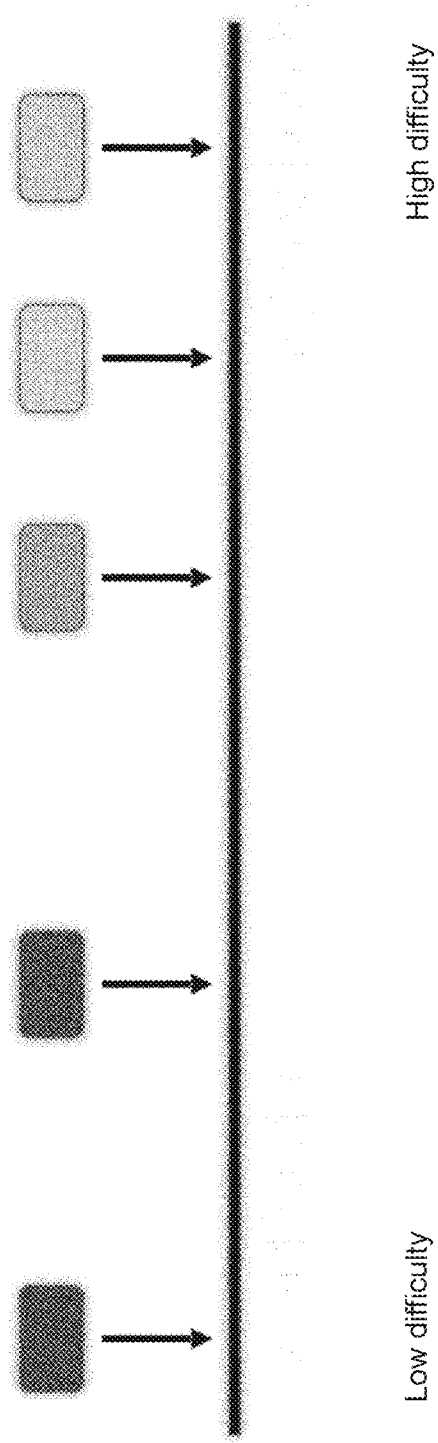
FIG. 2 is a diagram demonstrating that each of the individual items which comprise a standard neuropsychological test have varying difficulty.

A battery of separate neuropsychological tests exists in order to quantify the severity of Dementia of a patient, this can be for the purpose of diagnosis or monitoring of the disease. The tests are delivered in the form of individual items of varying difficulty which can be answered by the patient or carer to give an understanding of the severity of a patient's condition. This is as illustrated in FIGS. 1 and 2. Each of the items in these tests targets a specific clinical feature of Dementia and the particular deficits associated with the clinical feature under scrutiny. Current scoring methods of these tests typically involve the summing of question scores, or some variation thereof, meaning that the information yielded by individual items is not maximised.

An improvement to current scoring methods provided by the present invention is item response theory (IRT). IRT enables the scoring of individual items from tests according to their difficulty, and patients according to their ability, both with respect to some underlying latent trait, here a specific clinical feature of Dementia-related decline. Thereby, the central concept of IRT is the relationship between the way a participant responds to a question and the latent trait of which that question is indicative.

Item response theory is predicated on three key assumptions. Firstly: that all items in a given test are a measure of strictly one latent trait, known as unidimensionality. Multi-dimensional IRT is possible where there is assumed to be more than one latent trait, but is computationally complex owing to the increased number of parameters to fit from the data. The dimensionality of the data is, in this case, analogous to the number of latent traits measured by the given items. The number of latent traits is typically assessed using some form of factor analysis such as principal components analysis. Factor analysis generally assumes a normal distribution, which is somewhat unusual to obtain when the data collected is binary in nature; therefore, typically, factor analysis would fail in this special case. The second assumption is that each of the items in a test is locally independent, that is a right or wrong answer in one item should not automatically lead to an identical answer to another question. Items in a test should be correlated only through the latent trait of which they are a measure, if the item is a measure of more than one latent trait (i.e., multidimensional) correlation can legitimately be through multiple latent traits.

The third assumption is that a test taker—or participant— answers a question in such a way that is indicative of a latent trait to be measured. More specifically, the probability that a participant will answer a question correctly is a function of their latent ability of a given trait. Therefore, the higher a participant's latent ability of a specific trait, the higher the probability that they will answer a question correctly. The latent trait cannot typically be directly measured. In order to indirectly assess the capability of a participant with respect to this latent trait, items must be used which are an indirect measure. This theory can be applied more generally to measure many different kinds of latent traits, such as cognition and depression. The relationship between the participant's latent trait ability, and their probability to answer the item correctly is typically modelled using the standard logistic function.

In prior applications of item response theory to neuropsychological test data collected from subjects with Dementia, the test data is assumed to be one-dimensional, meaning that the items included in the analysis are assumed to measure a single latent trait. This latent trait is then assumed to be a proxy for Dementia, or a single aspect of Dementia.

Figure 3:
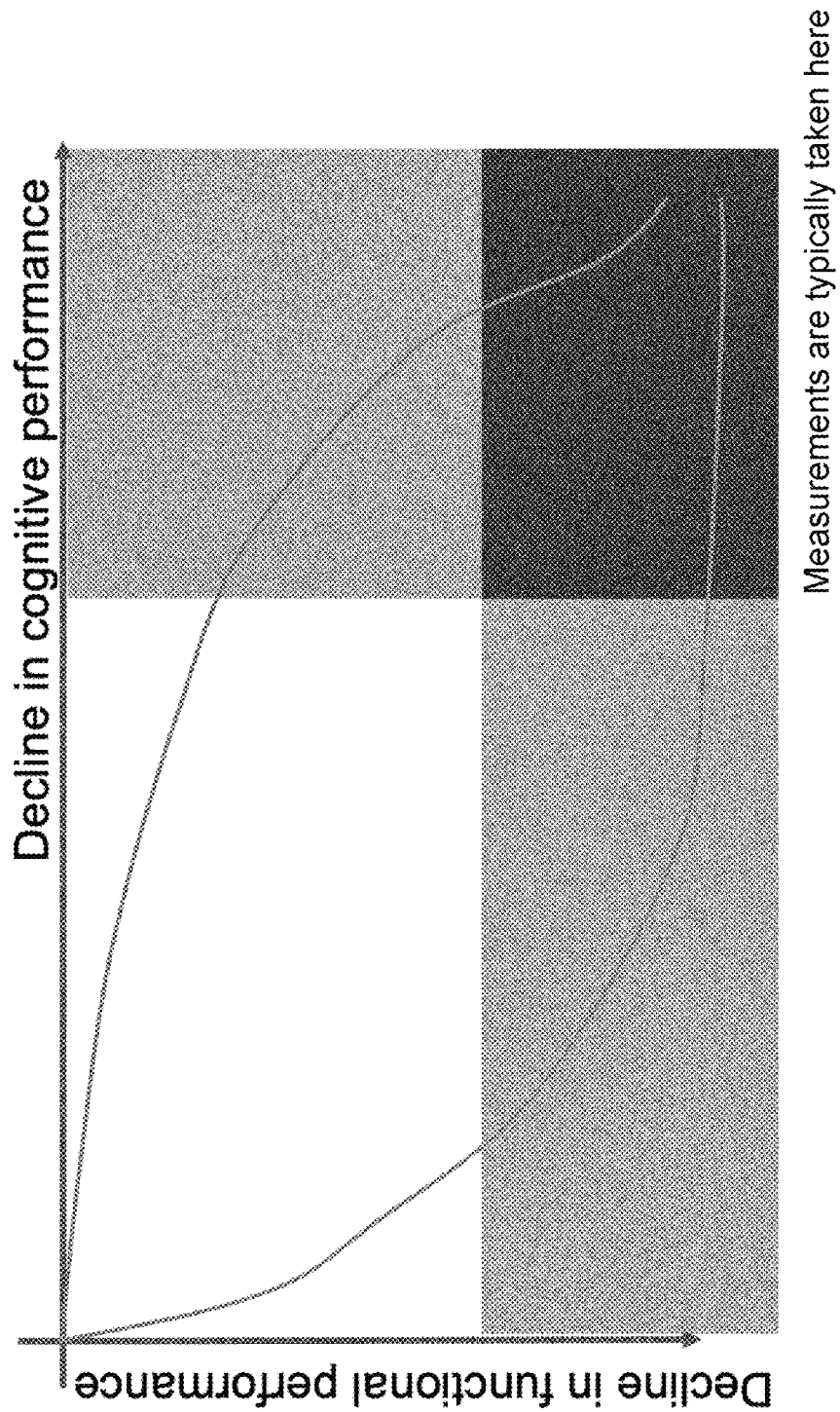
FIG. 3 is a graph which illustrates that disease presentation and progression is not uniform across subject decline, some may be impaired functionally and others, cognitively before subject decline trajectories meet at a more severe disease stage.

However, clinical observation has demonstrated that individuals show different impairments at different stages; disease presentation and progression is not uniform, as demonstrated in FIG. 3. For example, some patients may first show cognitive deficiencies but are still able to carry out activities of daily living, with other patients the opposite pattern could be apparent. Some patients show neuropsychiatric symptoms, which are not present in others. This leads to the suggestion that Dementia may not be measured on a single, one-dimensional scale, but rather a multidimensional space.

At a basic level, the multidimensional aspect of Alzheimer's disease and Dementia is already acknowledged within the clinical space. This is most clearly demonstrated by the requirement from the US Food and Drug Administration and the European Medicines Agency that any proposed treatment of the disease must show efficacy in cognition and also exhibit clinical meaningfulness, general interpreted as improving functional ability, as co-primary endpoints. Traditionally, separate tests have been used to measure each feature of interest. A measure such as the ADAS-Cog was designed to measure cognition, while a measure such as the ADL was designed to measure function. It is implied that scores on one test (and therefore also one feature) cannot provide any information about the subject's ability on the second test/feature: the interpretation of each test score is restricted to only the single feature it was designed to measure. This also causes the definition of the feature to be restricted by the test used to measure the feature. For example, the MMSE and ADAS-Cog are both considered tests of cognition. However, due to its brief nature, the MMSE provides only a measure of general cognition, while the more specialised ADAS-Cog provides a measure of AD-related cognition.

The use of IRT allows a subtle but significant shift to take place, removing the focus from the test used to measure a feature to the feature itself. This not only allows the definition of a feature to maintain independence from the test used to measure the feature, but also for the tests themselves to inform multiple different features. The question then arises as to which features or traits are of interest. The traditional dichotomy of cognition and function remains informative, with a slight broadening of the definition of function. The cognitive trait reflects primarily specific aspects of behaviour: the ability to remember a particular word or to copy a particular diagram. The function trait has traditionally been interpreted as activities of daily living, leading to tests designed to measure abilities such as making a meal or travelling independently. However, the presence of neuropsychiatric symptoms is also of diagnostic and clinical importance. Thus, the function trait, consequently referred to as the dementia trait, covers not only tasks of daily living but neuropsychiatric symptoms, bringing it more in line with guidance from the FDA and EMA regarding clinical relevance. The focus on traits also allows a previously undiscussed confound to be considered: depression. In classical test methods, the presence of depression can cause a subject's performance on tests of cognition or function to be lower than their true score. The subject is then perceived to be impaired when in reality the low score could be due to, for example, apathy. As previously stated, to detect the presence of depression in the classical test methodology would require a further test to be administered and, even then, the level of impact of the depression on cognitive ability would not be possible to quantify and so correct for. IRT allows depression to be identified as a separate latent trait without the need for a full test to be administered, and for the confounding effects of depression to be accounted for.

In applying multidimensional IRT to data from neuropsychological tests which measure many different aspects of Dementia, disparate datasets can be unified into a single analysis which captures disease progression across multiple areas.

General Mathematical Methods

The multidimensional IRT algorithm used in aspects of the present invention is realised in the form of an expectation maximisation (EM) algorithm, iteratively applying generalised linear models (GLM) to score questions and subjects. Initial conditions are estimated using summed subjects scores of seed questions assessed by a psychologist to be a good measure of the latent traits underlying subject decline in Dementia, namely cognition, functional impairment (dementia) and depression. The GLM is used to analyse binary subject responses to individual test items, firstly using subject score with respect to each postulated latent trait as covariates, in order to score each of the individual items. Then individual item scores with respect to each postulated latent traits are used to re-score the subjects. The EM algorithm is used to apply these GLMs in an iterative regime in order to locally maximise the likelihood of final test and subject scores.

As the data to be analysed herein is binary, or binarized, a special case of the binomial distribution—the Bernoulli distribution can be utilised, and therefore a GLM with a logistic regression link function is used (P. McCullagh and J. A. Nelder. *Generalized Linear Models*. Chapman and Hall., 1952. Ch. 4.3, pp 108). As discussed previously the logistic regression model forms the basis of other IRT models (e.g., the Rasch Model, the 2 and 3 parameter logistic models, as illustrated in B. Wright. A History of Social Science Measurement. *Educational Measurement: Issues and Practice*, Vol 16(4), 1997), as it restricts probability outcomes to between 0 and 1.

Given a set of parameters $\theta$, an expectation maximisation (EM) algorithm (for example, as disclosed in A. Dempster, N. Laird, and D. Rubin. Maximum likelihood from incomplete data via the EM algorithm. Journal of the Royal Statistical Society, 39, 1977) provides an iterative procedure for arriving at a locally maximised likelihood $L(\theta)$, a quantity for which it is not always possible to directly calculate the maximum. In each iteration of the EM algorithm, an update for the unknown parameter $\theta$ is calculated, in which $L(\theta_{t+1})$ is strictly larger than $L(\theta_t)$. The expectation (E) step of the algorithm calculates the expected value of the likelihood given the current, conditional parameter estimates of the investigated system $\theta_t$ and based on observed aspects of the statistical model, whether this be known parameters or observed data. The maximisation (M) step of the algorithm then maximises the likelihood with respect to the parameters estimated in the E step in order to calculate updated parameters $\theta_{t+1}$. The EM algorithm then continues to iterate between these two steps until the parameters being estimated converge to some tolerance.

The EM algorithm can take the form of iterative applications of GLMs to data in order to find the maximum likelihood estimates of hidden parameters. This makes it possible to concurrently estimate two dependent hidden parameters. Initial estimates are made of the first set of hidden parameters, and these initial estimates are used within the explanatory variable of the GLM in order to estimate a second set of hidden parameters. Using this second, estimated, set of hidden parameters as an explanatory variable it is then possible to estimate the first set of hidden parameters, reducing reliance upon the initial estimate. This process is then iterated until the estimates of the first and second sets of hidden parameters both converge independently to some tolerance. Where A and B are the first and second hidden sets of parameters respectively, this follows the algorithm:

1. $A_{(0)}$ is initialised with some sensible estimate
2. $B_{(t)}$ is then estimated using a GLM with estimates $A_{(t)}$ included in the explanatory variable.
3. $A_{(t+1)}$ is also estimated using a GLM with previous estimates $B_{(t)}$ included in the explanatory variable.
4. Steps 2 and 3 are then iterated until the estimates for $A_{(t)}$ and $B_{(t)}$ are each converged.

Multidimensional IRT methods are known per se, which estimate scores for individual items in multiple domains. However, the nature of neuropsychological data collected from patients is such that it is subject to large fluctuations dependent upon the "on-the-day" condition of the patient. These natural fluctuations increase the complexity of the data analysis. A primary concern in analysing the data is to ensure that any algorithm implemented arrives at a result which is mathematically meaningful. That is to say, a global optimum in the likelihood landscape of the multidimensional space is found, and not simply a local optimum. This means that traditional methods of multidimensional item response theory analysis can fail to converge on a global optimum, or result in a complete failure to converge, as is the case with the particular dataset exemplified herein.

Therefore a modified form of item response theory is provided which enables the pre-specification of initial conditions to aid in guiding the algorithm towards a global optimum solution. This is achieved by use of generalised linear models, which are seeded with pre-specified initial conditions and contained in an expectation maximisation algorithm, scoring items and subjects from a training set of data until convergence, as described previously. Using a priori knowledge of the question set in the form of initial conditions allows the convergence of an algorithm upon a result which can be externally validated and is robust to changes in initial conditions.

The model to be used to analyse the data is of the form $$Y_{i,q} \sim \text{Bernoulli}(\alpha + \beta_q \text{cog}_i + \gamma_q \text{dem}_i + \delta_q \text{dep}_i) \qquad \text{Eqn. 4.1}$$

where i is the subject at a specific visit, and q is the question. Therefore, $\alpha$ is the intercept, and $\beta_q$, $\gamma_q$ and $\delta_q$ are the cognitive latent trait score, the dementia latent trait score and the depression latent trait score of each question respectively. Furthermore, $cog_i$, $dem_i$ and $dep_i$ are the cognitive latent trait score, the dementia latent trait score and the depression latent trait score of each subject at their specific visit(s) respectively.

In order to overcome a reliance of the question scores upon the initial question seedings, an expectation maximisation algorithm was used, as discussed above. This expectation maximisation algorithm worked iteratively to ensure a data driven final result of the difficulty of the items in each latent trait.

The algorithm was constructed as follows:
1. Initial scores for the cognitive latent trait, the dementia latent trait, and the depression latent trait ($cog_i^0$, $dem_i^0$ and $dep_i^0$) are calculated for each subject at each of their visits, by counting of the relevant item responses for each category. These item responses are consequently summed and normalised to between 0 and 30.
2. Fit the generalised linear model using $cog_i^t$, $dem_i^t$ and $dep_i^t$ as fixed covariates with $\alpha=0$, to find $\beta_q^t$, $\gamma_q^t$ and $\delta_q^t$.
   a. Identify extreme outliers (those outside the interquartile range ±three times the interquartile range) and set these extreme outliers to the maximum/minimum of data within this range.
   b. Set question score to 0 in a given latent trait if the standard error overlaps with 0.
   c. Take the absolute value of all scores.
3. Fit the generalised linear model using $\beta_q^t$, $\gamma_q^t$ and $\delta_q^t$ as fixed covariates, with $\alpha=0$ to find $cog_i^{(t+1)}$, $dem_i^{(t+1)}$ and $dep_i^{(t+1)}$.
   a. Identify extreme outliers (those outside the interquartile range ±three times the interquartile range) and set these extreme outliers to the maximum/minimum of data within this range.
   b. Set subject score to 0 in a given latent trait if the standard error overlaps with 0.
   c. Take the absolute value of all subject scores.
   d. Normalise score to between 0 and 30.
4. Iterate steps 2 and 3 until convergence.

As will be appreciated, certain steps of the algorithm discussed above may be omitted or modified whilst still resulting in an algorithm able to achieve the intended result. For example, the sub-steps of identifying the extreme outliers in steps 2 and 3, setting scores to 0, or using a different normalisation range may be omitted, or have their absolute values modified. Similarly the normalisation of the initial patient scores in step 1 may also be omitted or modified. However, the general method set out in steps 1, 2, 3, and 4 should be applied.

Here the algorithm is specifically described in the framework of application to binary data originating from subjects with Dementia, where the specific dataset analysed herein originates from subjects with mild Alzheimer's disease. However, an algorithm of this type is more generally applicable across different forms of data, with the adaptation of the GLM to a different kind of model to suit, for example, non-binary data.

Dataset and Pre-Processing

The data used in the creation of an embodiment of the present invention was collected from patients with diagnosed Dementia and specifically patients diagnosed with Alzheimer's disease. However the principles discussed herein apply equally to data collected from patients with, e.g. behavioural variant frontotemporal dementia. The data originated from clinical trials for a drug to inhibit the aggregation of tau protein in the brain. Pathologies such as Dementia are associated with tangles of tau protein which inhibit cell transport. Clinical trials are conducted in separate phases to test their safety and efficacy. The data analysed herein originates from phase 3 trials, conducted to investigate drug effectiveness. The data was collected from a variety of neuropsychological tests, at various specified time points during subject treatment.

As examples, the tests analysed in this document are:
1. Mini-Mental State Examination (MMSE), an assessment of cognition.
2. Alzheimer's Disease Assessment Scale—cognitive subscale (ADAS-cog), a different assessment of cognition.
3. Alzheimer's Disease Cooperative Study—Activities of Daily Living Inventory (ADL), an assessment of functionality of an Alzheimer's patient with respect to everyday activities.
4. Neuropsychiatric Inventory (NPI), an assessment of neuropsychiatric symptoms.
5. Montgomery-Asberg Depressing Rating Scale (MADRS), an assessment of depression.

Each of the tests comprise multiple items which, together, aim to give an insight into the severity of the Dementia of a patient. There is discussed herein a scoring system which can describe each of these tests in the same space. That is to say, mathematically describe independent tests and items within those tests according to the latent traits of which they are a measure, in the same n-dimensional space.

Data collected from the specific neuropsychological tests investigated for the purposes of the discussion herein can take the form of dichotomous or polychotomous data. For the purpose of standardisation all data is processed or cut to ensure that it is binary and that an answer of "1" is indicative of a positive response and an answer of "0" is indicative of a negative response. In order to ensure that all data is binary the divide-by-cut method is employed. Taking an example from the ADL test:

"Regarding eating: Which best describes the subject's usual performance during the past 4 weeks?
  3—ate without physical help, and used a knife
  2—used a fork or spoon, but not a knife, to eat
  1—used fingers to eat
  0—subject usually or was always fed by someone else"

Possible answers to this item are 0, 1, 2, and 3. In order to make the item binary, it is split into multiple items each with a binary type response:

"Regarding eating: Does the subject score higher than 0?
Regarding eating: Does the subject score higher than 1?
Regarding eating: Does the subject score higher than 2?"

This method was applied to all polychotomous questions to ensure that all data collected was binary.

The second point is to ensure that all positive answers are encoded "1" and all negative answers are encoded "0". As the neuropsychological tests of interest all pertain to the diagnosis of Dementia, a negative answer is one that is indicative of that disease, for a more general application this can be adapted to generally encoding a "1" as positive, and a "0" as negative. The response to all items was oriented to reflect this. Of course, it will be appreciated that the inverse situation could also be applied i.e. negative answers are encoded "1" and positive answers encoded "0". In which case, the higher the score the more probable it would be that the subject has Dementia.

Results

The methods discussed herein for scoring items according to underlying latent traits was achieved using an expectation maximisation algorithm and generalised linear models as described in the general mathematical methods section.

Figure 4:
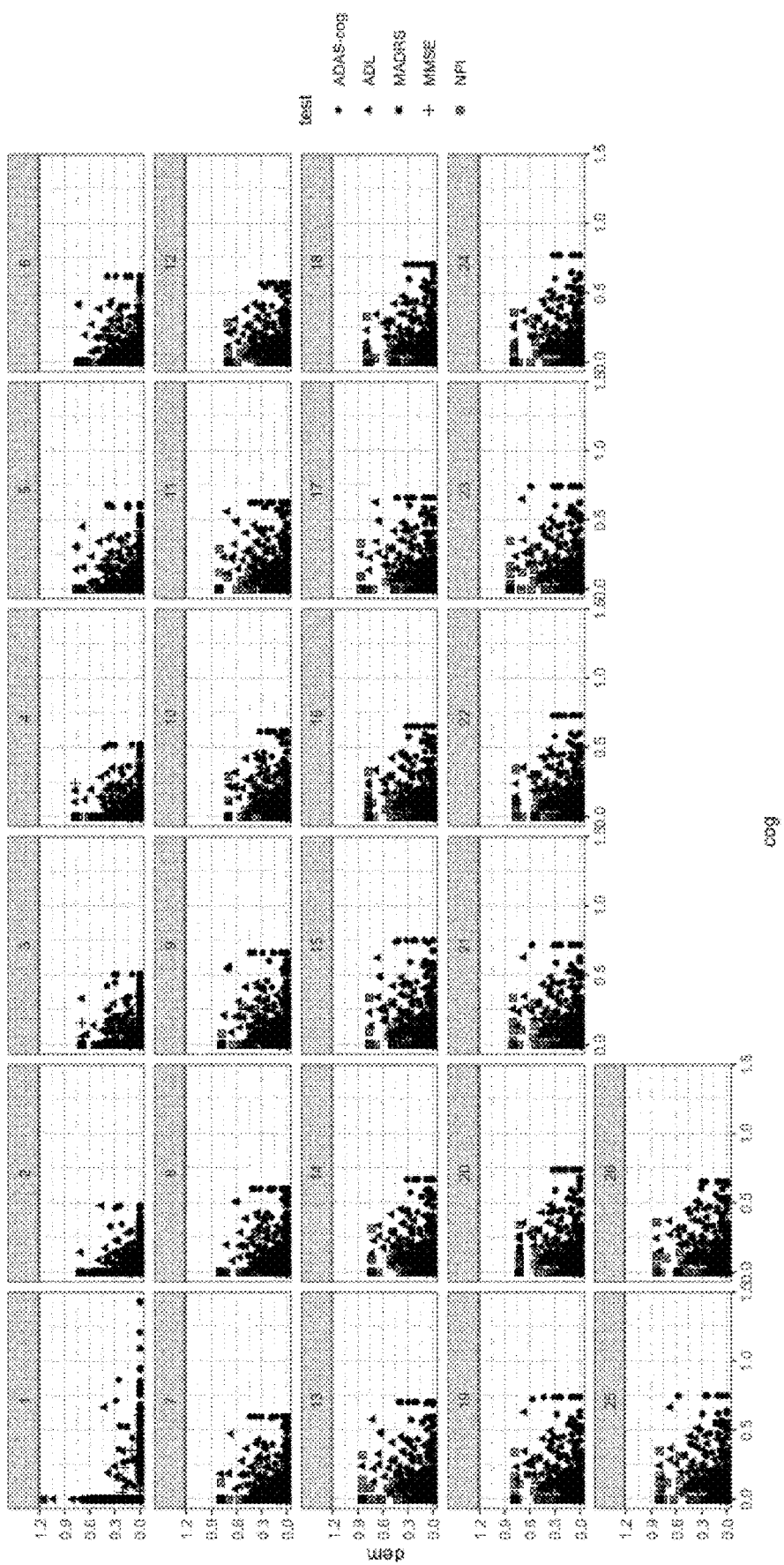
FIG. 4 is a graph showing the item difficulty scores $\beta$ and $\gamma$ relating to the cognitive and dementia latent trait respectively, for items from the MMSE, ADAS-cog, ADL, NPI and MADRS tests of 26 iterations of the expectation maximisation algorithm discussed below.
Figure 5:
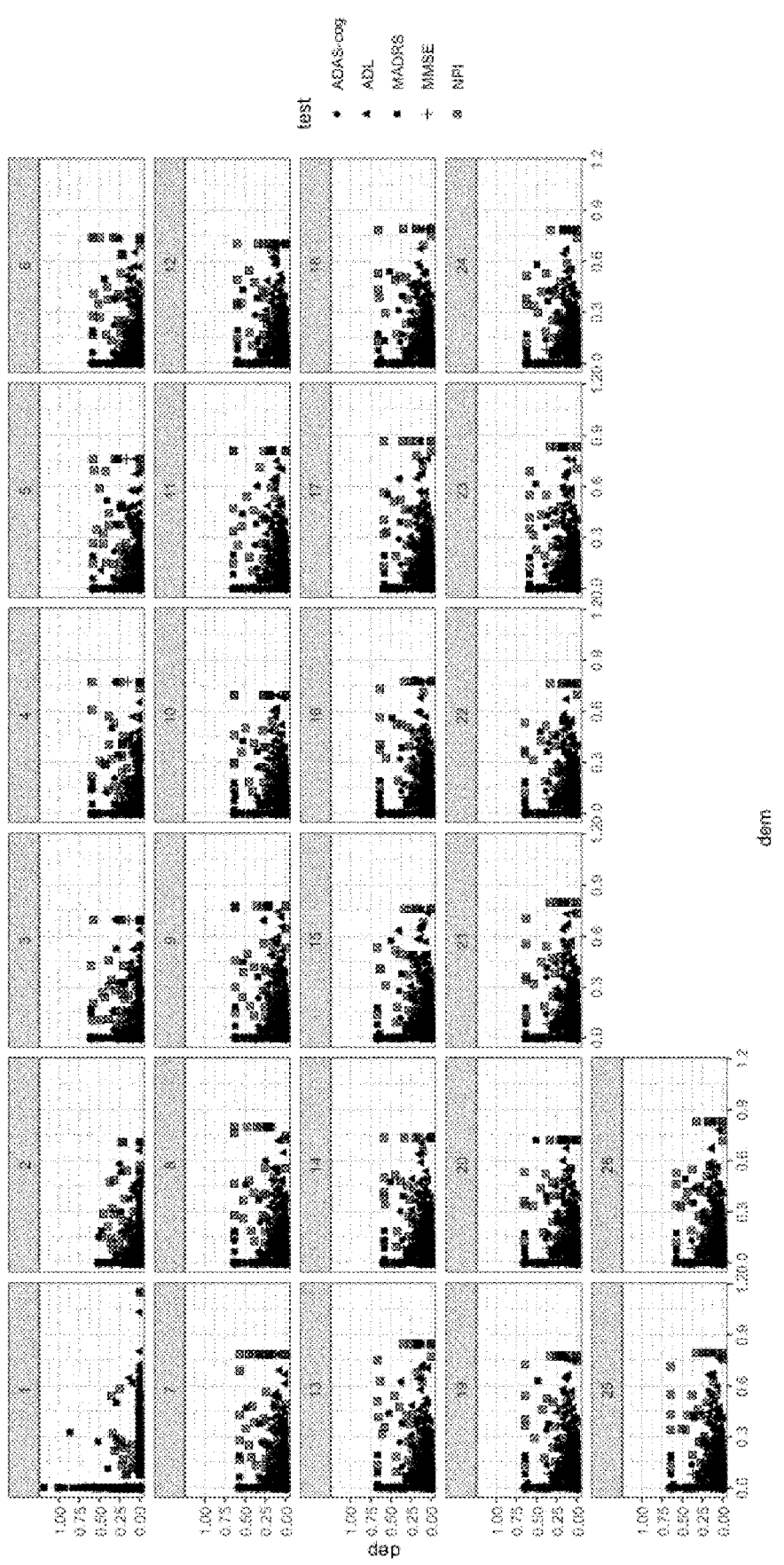
FIG. 5 is a graph showing the item difficulty scores $\gamma$ and $\delta$ relating to the dementia and depression latent trait respectively, for items from the MMSE, ADAS-cog, ADL, NPI and MADRS tests of 26 iterations of the expectation maximisation algorithm discussed below.

Implementing this algorithm yields item scores $\beta_q$, $\gamma_q$ and $\delta_q$ at each iteration. FIG. 4 shows item difficulty scores $\beta_q$ and $\gamma_q$ relating to the cognitive and dementia latent traits respectively for items from the MMSE, ADAS-cog, ADL, NPI and MADRS tests of 26 iterations of the expectation maximisation algorithm described previously. FIG. 5 shows item scores $\gamma_q$ and $\delta_q$ for the aforementioned tests with respect to the dementia and depression latent traits. In earlier iterations, the difficulty scores $\beta_q$, $\gamma_q$ and $\delta_q$ for each question are subject to some movement, which occurs as a result of the unsupervised nature of the algorithm. Aside from an initial input of an approximate score for $cog_i$, $dem_i$ and $dep_i$ per subject per visit, the algorithm is data driven. Variation of item scores between iterations is expected and justifies the use of an expectation maximisation algorithm. It demonstrates that the item scores $\beta_q$, $\gamma_q$ and $\delta_q$ in later iterations are independent of the initial subject scores $cog_i^0$, $dem_i^0$ and $dep_i^0$, calculated from the seed questions. However, in later iterations convergence of the item scores $\beta_q$, $\gamma_q$ and $\delta_q$ is achieved with minimal change between iterations. As has been discussed previously, the expectation maximisation algorithm will converge to the maximum likelihood estimates of parameters. As convergence is achieved in this instance, it can be stated that the expectation maximisation algorithm discussed above has resulted in item scores per question with a locally maximised likelihood.

Figure 6:
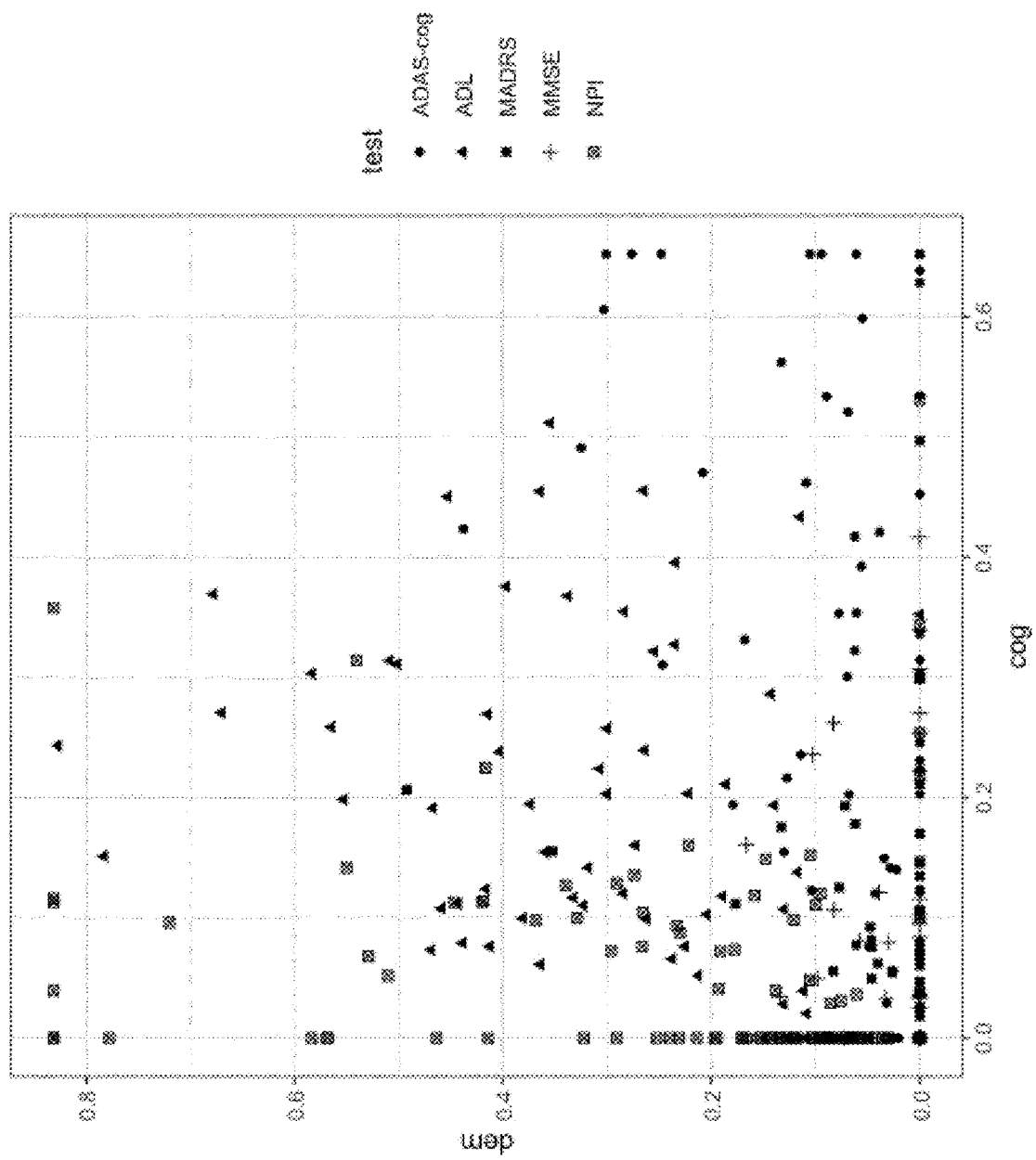
FIG. 6 is a graph showing the item difficulty scores $\beta$ and $\gamma$ relating to the cognitive and dementia latent trait respectively for items from the MMSE, ADAS-cog, ADL, NPI and MADRS tests at convergence of the expectation maximisation algorithm described below.
Figure 7:
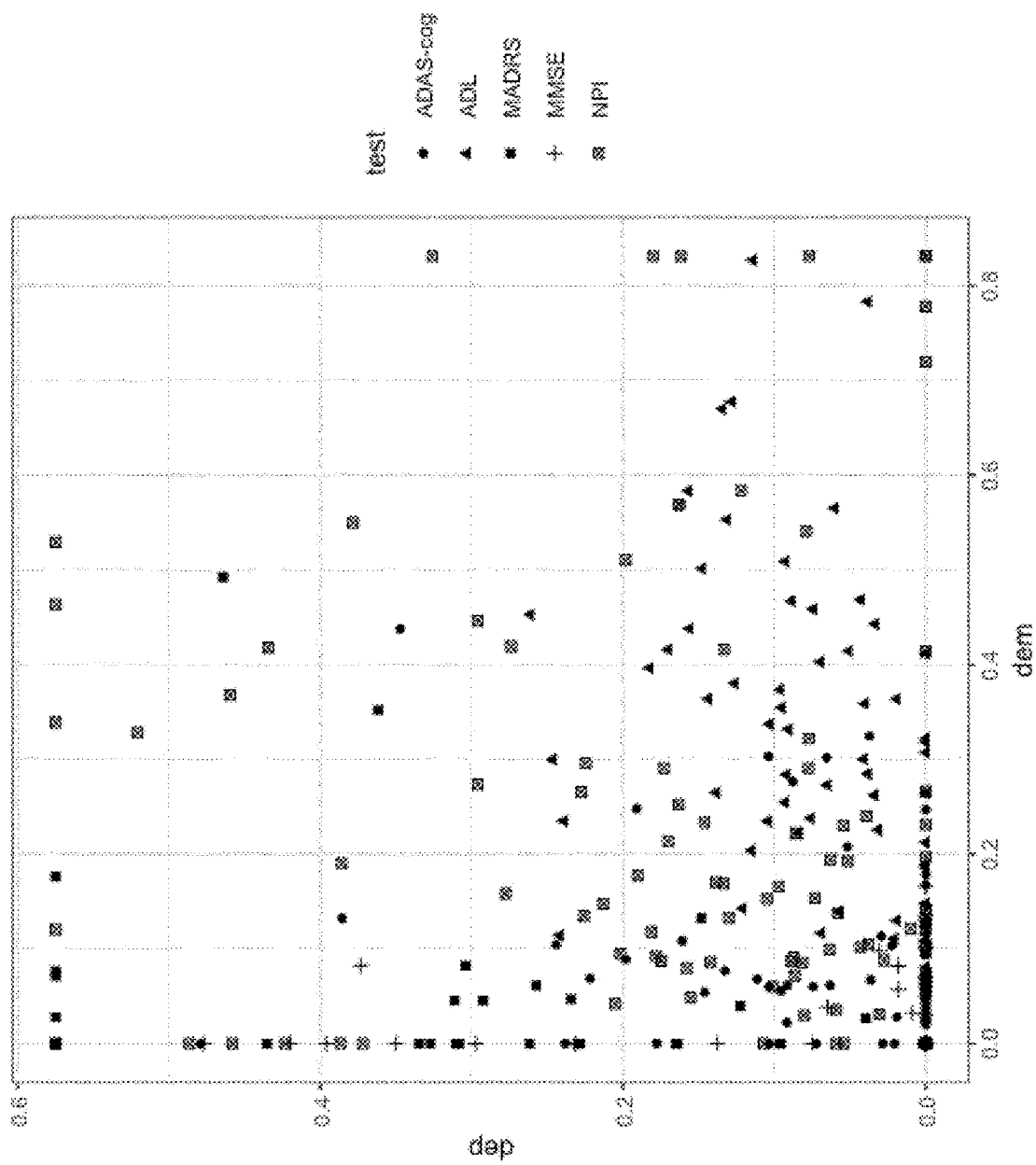
FIG. 7 is a graph showing the item difficulty scores $\gamma$ and $\delta$ relating to the dementia and depression latent trait respectively for items from the MMSE, ADAS-cog, ADL, NPI and MADRS tests at convergence of the expectation maximisation algorithm described below.

In FIG. 6 the final item scores $\beta_q$ and $\gamma_q$ are shown. The MMSE and ADAS-cog tests vary predominantly along the $\beta$, or cognitive latent trait, axis; and the ADL test varies along the both the cognitive ($\beta$) latent trait and $\gamma$, or dementia latent trait, axis and the NPI varies along the dementia ($\gamma$) latent trait. FIG. 7 shows the final item scores $\gamma_q$ and $\delta_q$, it shows that the MADRS is broadly a measure of solely the depression trait, $\delta$, and the NPI appears to be a measure of both the depression ($\delta$) and dementia ($\gamma$) latent traits.

Robustness Analyses
Initial Conditions

The results presented in FIGS. 6 and 7 are achieved when the items used to calculate, $cog_i^0$, $dem_i^0$ and $dep_i^0$ are chosen by a psychologist as good measures of the underlying trait. Subject scores for these questions are then summed and normalised to give the algorithm an initial first estimate of subject latent trait scores. FIGS. 6 and 7 show results when 68% of the items scored are used to calculate a priori subject scores in this manner. The robustness of the algorithm was explored by randomly reducing the number of these initial questions, firstly to 34% of the complete set of items used and then to 6.8%. Including fewer seed items reduces the initial information used to score the items. Using many items can be inherently problematic, as large proportions of items that can be seeded are not always available, although there cannot be too many seed questions as the algorithm is entirely non-prescriptive. However, seeding too few items can lead to the algorithm being numerically unstable, and therefore being unable to correctly score further items according to latent trait.

The initial conditions are devised by grouping together questions which could be answered similarly and devising a simple score for each subject at each of their visits from these items. This means that an individual item is not assigned to a latent trait from which it cannot deviate, it is used to contribute to a larger picture of what each latent trait should look like. When too few seed items are used, an insufficient idea of the latent traits is communicated to the algorithm, meaning that the algorithm is prevented from yielding the same results as if more items were included a priori.

Figure 8:
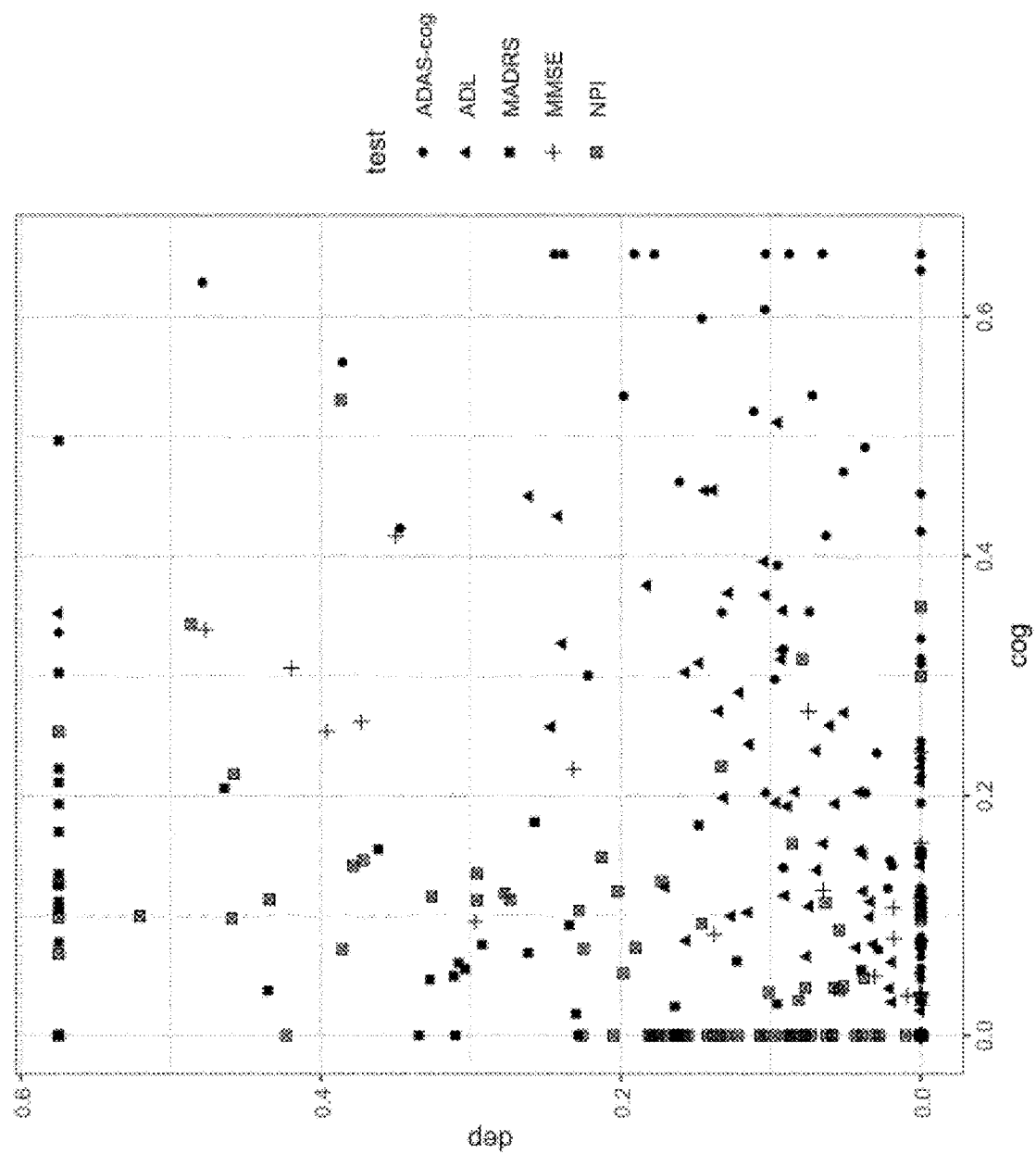
FIG. 8 is a graph showing the item difficulty scores $\beta$ and $\gamma$ relating to the cognitive and dementia latent trait respectively for items from the MMSE, ADAS-cog, ADL, NPI and MADRS tests at convergence of the expectation maximisation algorithm described below, using a reduced set of seed questions to estimate initial conditions (6.8% of complete question set)

Seeding 34% of the complete set of items and calculating questions scores using the same method yielded a median percentage change of individual item score of 2.9% in the cognitive domain, 2.2% in the dementia domain and 1.8% in the depression domain. Repeating the procedure using 6.8% of the initial seed questions yielded a median percentage change of 6.7% in the cognitive domain, 7.7% in the dementia domain and 6.9% in the depression domain. Relatively small percentage changes in question score occur despite large reduction in the number of initial questions used to calculate initial patient score estimates. These small percentage changes do not affect the interpretation of the items as they relate to the underlying latent traits, as demonstrated in FIGS. 6 and 8, which shows minimal differences between seeding 68% (FIG. 6), and seeding 6.8% (FIG. 8) of the complete question set for estimation of initial conditions. Taken together, the above provides evidence that the algorithm is robust to differing initial conditions.

Item Difficulty Ordering

Figure 9:
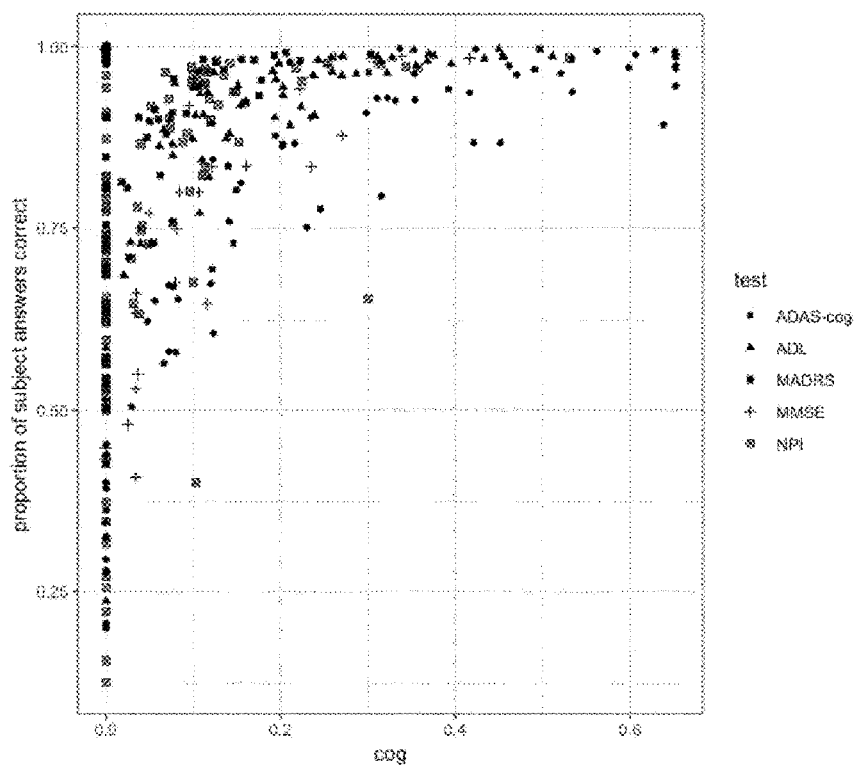
FIG. 9 is a graph showing the item difficulty scores $\beta$ for the cognitive latent trait compared to the proportion of subjects that responded to the question correctly for items from the MMSE, ADAS-cog, ADL, NPI and MADRS tests at convergence.
Figure 10:
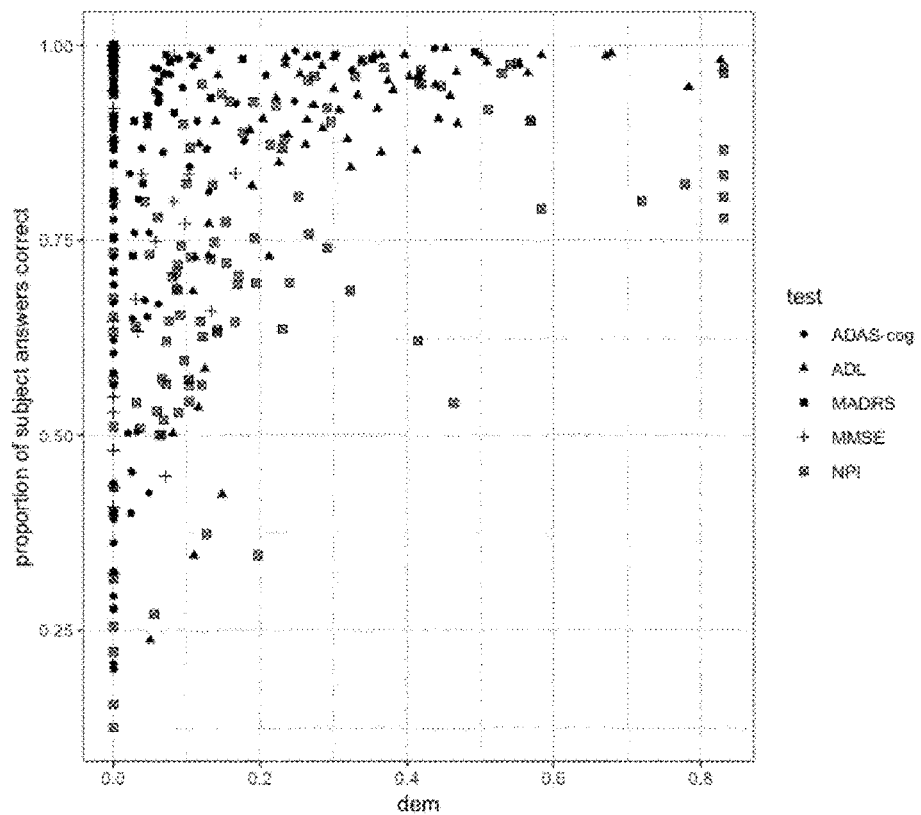
FIG. 10 is a graph showing the item difficulty scores γ for the dementia latent trait compared to the proportion of subjects that responded to the questions correctly for items from the MMSE, ADAS-cog, ADL, NPI and MADRS tests at convergence.
Figure 11:
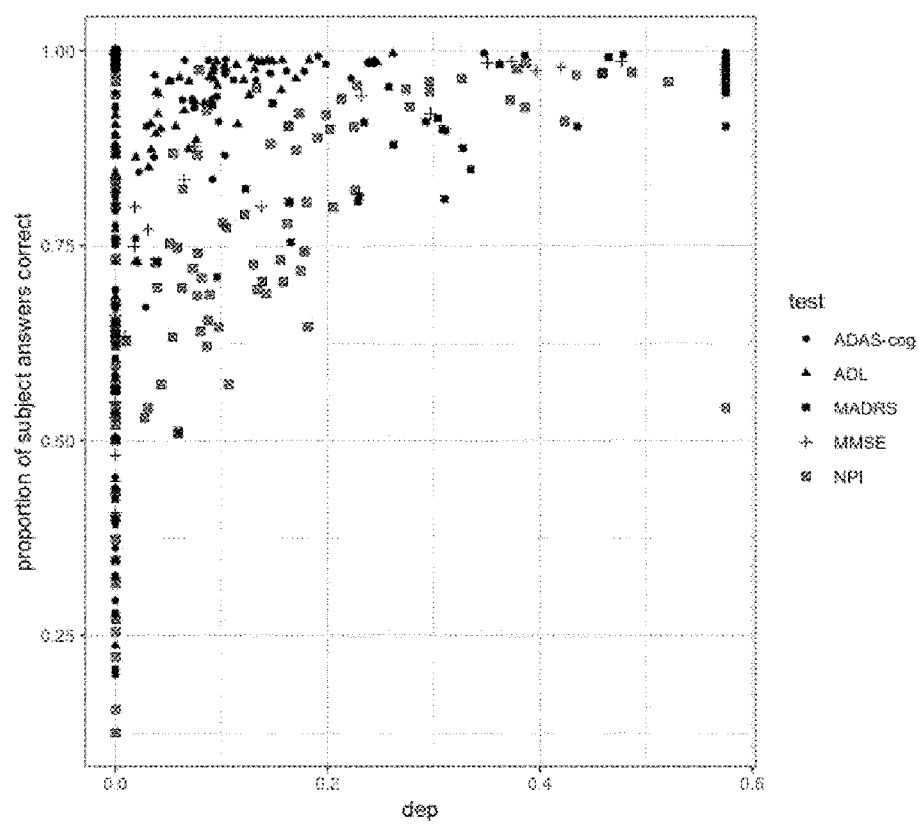
FIG. 11 is a graph showing the item difficulty scores δ for the depression latent trait compared to the proportion of subjects that responded to the questions correctly for items from the MMSE, ADAS-cog, ADL, NPI and MADRS tests at convergence.

Individual items are scored in a way which is analogous to their difficulty with respect to the cognitive, dementia, and depression latent trait. Items with a higher score with respect to a latent trait have a lower difficulty with respect to that latent trait. FIGS. 9, 10 and 11 show the difficulty scores—according to the cognitive, dementia and depression latent traits—of each of the items in the MMSE, ADAS-cog, ADL, NPI and MADRS tests and the proportion of subjects that answered the questions correctly.

FIG. 9 shows the item difficulty score with respect to $\beta$, the cognitive latent trait, and the proportion of subjects that answered the question correctly. Questions which a high proportion of subjects answered correctly are assumed to be of a lower difficulty and vice versa. FIG. 9 shows that there is a strong relationship between the item score in the cognitive latent trait and the proportion of subjects that answered the question correctly. This is indicative of the items being well ordered by difficulty with respect to an individual latent trait. The same results are present in FIGS. 10 and 11, which present item difficulty with respect to $\gamma$, the dementia latent trait, and $\delta$, the depression latent trait. Indicating that the algorithm can correctly order items according to difficulty in multiple dimensions.

Justification of 3-Dimensional Model

Taken together, the results presented provide evidence that the MMSE, ADAS-cog, ADL, NPI and MADRS are answered independently of each other. That is to say, three independent latent traits govern the way in which subjects answer the items from these tests. The independent dimensions are designated as the cognition, dementia and depression latent traits. These latent traits can be distinguished most clearly when seed questions are used to enhance the algorithm with some a priori knowledge of the latent traits to be discovered and an expectation maximisation algorithm is used but are also present in the naïve item response theory. The use of a 3-dimensional model to represent the data is tested by the use of a likelihood ratio test to assess whether a 3-dimensional model gives a statistically significant better fit to the data than a reduced, 2-dimensional model. Sequentially removing latent traits and comparing the resulting 2-dimensional models against the 3-dimensional model, resulted in 80% of subjects benefitting from a 3-dimensional model when the depression dimension is removed. When the dementia latent trait is removed from the model 60% of subjects benefited from the 3-dimensional model, and finally, when the cognitive latent trait is removed 79% of subjects benefited from the 3-dimensional model. Taken together these results show that at least 60% of subjects benefited from the fitting of a 3-dimensional model, justifying the use of at least 3 latent traits to characterise the progression of mild Alzheimer's disease.

The methods discussed above have shown that by characterising items of a plurality of dementia tests, it is possible to investigate specific latent traits by selection of items (i) the answers of which are indicative to that specific latent trait; and (ii) with an appropriate degree of difficulty given previous answers.

Conclusion

In conclusion, what has been presented herein is evidence showing that individual items from distinct neuropsychological tests can exist within the same multidimensional space. This space mathematically characterises how well individual items measure underlying latent traits in subjects with mild Alzheimer's Disease. The general algorithm is an application of the expectation maximization to item response theory; realised herein in the form of generalised linear models.

Computer Adaptive Testing Algorithm Implemented in a Neuropsychological Test

Figure 12:
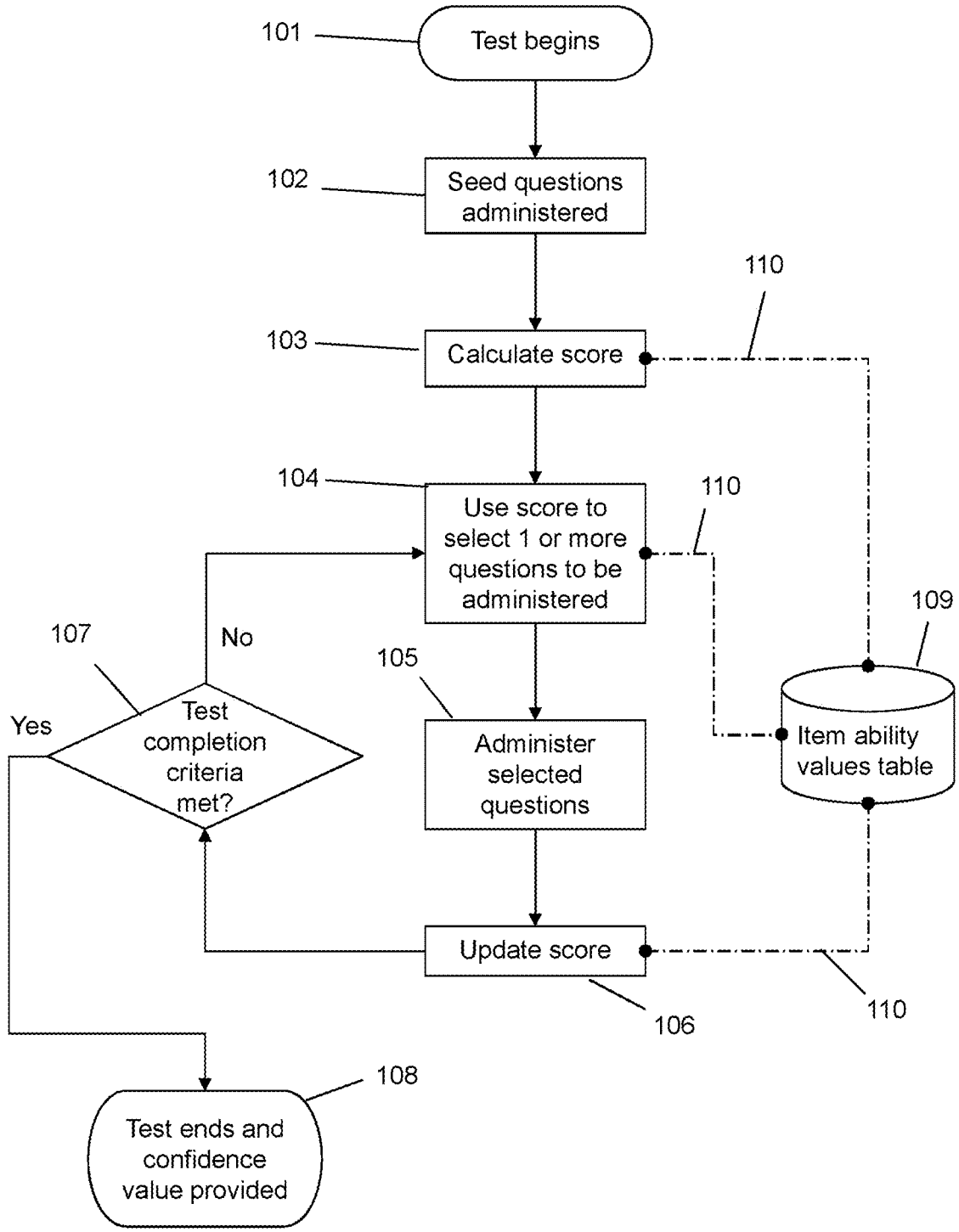
FIG. 12 shows a flow diagram of an implementation of an adaptive neuropsychological test.

FIG. 12 shows a flow diagram of an implementation of an adaptive neuropsychological test using the principles discussed above. The test begins in step 101, and subsequently one or more seed questions are administered in step 102.

After the subject answers the one or more seed questions, a score for the latent trait being measured is calculated in step 103. In order to calculate the score, an item value lookup function 101 is used to access a store 109 or question ability or difficulty values. The detail of this calculation is discussed below.

Subsequently, the score is used (in step 104) to select one or more questions to be administered. Again, question/item ability or difficulty values are accessed via the item value look-up function 101. The detail of the selection of one or more subsequent questions is discussed below.

After selecting the one or more further questions, they are administered in step 105 and the results recorded. These results are used to update the score for the latent trait in step 106. After this, a decision is made as to whether the test completion criteria has been met (see decision box 107). The test completion criteria could be, for example, a minimum confidence value. Alternatively, the test completion criteria could be manually triggered by an administrator of the test, or could be automatically triggered when a predetermined number of questions have been administered.

If the test completion criteria has not been met, the loop returns to step 104 and repeats the sequence discussed above. This loop from step 104, to 105, then 106, and back to 104 defines the adaptive test loop.

If the test completion criteria has been met, the loop moves to step 108 and the test ends. Confidence values in the output of the test are provided. The output of the test may be, for example, a dementia rating score or the score value for the latent trait being measured.

Figure 13:
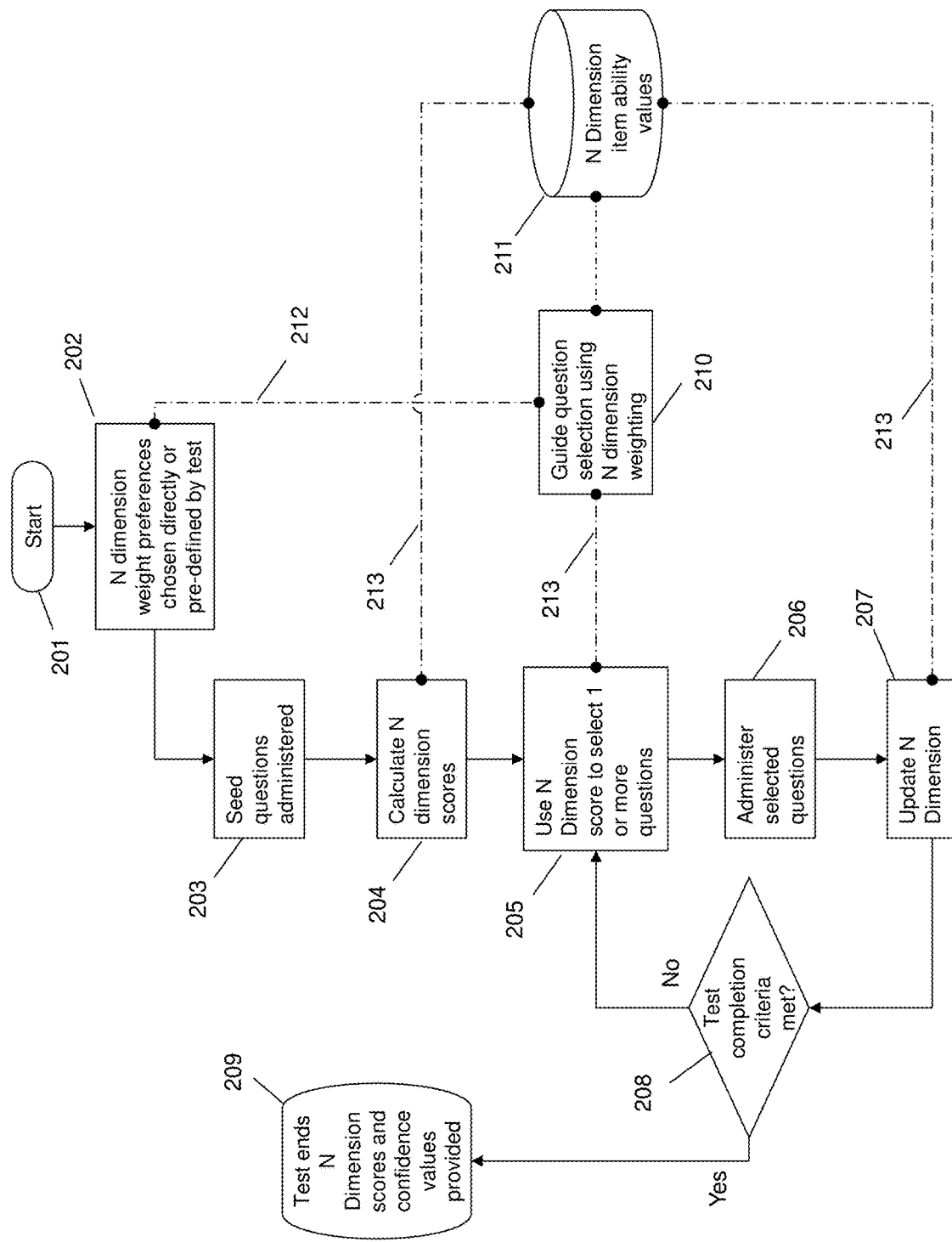
FIG. 13 shows a flow diagram of a further implementation of an adaptive neuropsychological test.

FIG. 13 shows a flow diagram of a further implementation of an adaptive neuropsychological test. A distinction between the flow diagram of FIG. 12 and the flow diagram of FIG. 13 is that in FIG. 13 the test is performed for N latent traits/dimensions.

Thus, after the test starts in step 101, an N dimension weight preference is chosen for each dimension, either directly or it may be predefined by the test. The weight preference may, in some examples, be a binary weighting i.e. 0 indicating the latent trait is not to be measured, and 1 indicating that it is to be measured. Alternatively, the weight preference may be indicative a preference for the administrator to which latent trait should be measured. For example, a weight preference of 0.5 for dem and 1 for cog may indicate that the administrator of the test requires a score value for the cog latent trait and (if possible) would like a score value for the dem latent trait. The N dimension weighting is sent, via link 212, to a module 210 discussed below.

After selection of the N dimension weight preferences, the test begins in step 203 where one or more seed questions are administered. Subsequently, in step 204, N dimension scores are calculated. In order to calculate the N dimension scores, an N dimension values per item lookup function 213 operates, and interacts with store 211. Store 211 contains N dimension question ability/difficulty values.

Having calculated an initial value for each of the N dimensions, the test (in step 205) uses these values to select 1 or more questions. Here, the test utilises the same function 213 used to lookup the N dimension values per question, but the selection is modified or guided based on the previously set N dimension weighting by module 210. For example, if a weight preference of 0 was set for dem, no questions relating to the dementia latent trait will be selected.

Once the questions have been selected, they are administered in step 206 and the answers recorded. The answers to these questions are used in step 207 to update the N dimension scores. This updating step also uses the function 213 to retrieve the N dimension question ability/difficulty value.

After the scores are updated, the test determines (see decision box 208) whether the test criteria has been met. The test completion criteria could be, for example, a minimum confidence value. Alternatively, the test completion criteria could be manually triggered by an administrator of the test, or could be automatically triggered when a predetermined number of questions have been administered.

If the test completion criteria has not been met, the test returns to step 205 and enters the adaptive test loop.

If the test completion criteria has been met, the test moves to step 209 where the test ends and N dimension scores and confidence values are provided.

Calculation of Subject Score:

To calculate the score of a subject, and the corresponding confidence interval given the subject's answers to the administered questions, a maximum likelihood estimator is used. The likelihood estimate of a subject having a given score is calculated, and the subject ability score with the maximum likelihood is chosen. The likelihood estimate, r, of a question is calculated as $$r = q \times x \times e$$

If the subject answer is incorrect or $$r = -q \times x \times e$$

Otherwise. Where q and e are both variables associated with the difficulty of a given question, and x is the ability of the subject. The likelihood is calculated at each subject ability x as $$L_x = -\log(1 + e^r)$$

And is summed over all questions answered for each x. The subject ability x with the highest $L_x$ is the maximum likelihood estimate of the subject ability. The confidence intervals are calculated based on 1 standard deviation of the maximum likelihood estimate of the subject score, which corresponds to a 68% confidence interval. A 68% chi-squared test has a threshold of 0.9889 and a 2×log-likelihood is mathematically similar to a chi-squared test. Therefore the confidence interval is based on $$\max(L_x) - \left(\frac{0.9889}{2}\right).$$

The range of x in accordance with this range in $L_x$ is the confidence interval.

The above method can be applied simultaneously to multiple dimensions to calculate subject ability scores on multiple latent traits. Such a calculation can be done using the same method applied to specific trait $q_d$ and $e_d$ in which d is the latent trait/dimension to be measured, and correspondingly the subject ability $x_d$ is specific to the latent trait/dimension to be measured.

Calculation of Next Question

In order to choose the next question to be administered which are best suited to the ability range of the subject, the information content, $I_{qx}$, of each question at a given ability score x is calculated as $$I_{qx} = \frac{1}{1 + e^{-qx+e}} \times \frac{1}{1 + e^{qx+e}} \times q^2$$

An iterative procedure then begins to pick the next question or questions. This is achieved by calculating the information content of the current set of proposed next questions. This information content of the set of next questions is calculated by summing the information content $I_{qx}$ over all questions in the set of proposed next questions (one is added per iteration) for each patient ability within a pertinent range. This pertinent range is calculated to between the lower confidence interval−2, lowerCI−2, and the upper confidence interval+2, upperCI+2.

$$I_w = \sum_{q=1}^{n} I_{qx}$$

Where n is the number of questions in the proposed set of next questions.

Then the information content for each possible eligible question for the proposed set of next questions is calculated. This is done by summing the information content for each question over all pertinent subject abilities x and weighting by the information content of the current proposed set of next questions at each x $$I_q = \sum_{x=lowerCI-2}^{upperCI+2} I_{qx} \times I_w$$

The questions with the highest information content $I_q$ is then added to the proposed set of next questions and the process's iterative procedure begins again. The procedure continues until a maximum set number of next questions has been chosen (for example, n=1, or n=5), the list of eligible questions is empty, or the highest information content of any questions is 0.

As previously, the method can be applied to multiple latent traits in the same way by using question scores $q_d$ and $q_d$, and subject ability score $x_d$, specific to that latent trait.

Worked Example

A subject answers example seed questions in such a way (where questions are coded for ease of use):
'deps_thoughts_slowed': 'Y', 'dob_year_correct': 'Y', 'age_correct': 'Y', 'mem_pm_prev': 'N', 'mmse_year': 'N', 'deps_sad': 'N', 'dob_date_correct': 'Y', 'mmse_month': 'Y', 'deps_diff_concentrate': 'N', 'mem_pm': 'Y', 'mmse_season': 'Y', 'mmse_date': 'N', 'mmse_city': 'Y', 'mmse_building': 'Y', 'deps_diff decisions': 'N', 'deps_prefer_alone': 'N', 'dob_month_correct': 'Y', 'mmse_dayweek': 'Y', 'deps_lost_energy': 'N', 'forget_start_date': '24', 'deps_more_tense': 'N', 'forget_where_more': 'Y', 'prax_coin': 'Small'.
Score=17.1, confidence interval=[14.7,19.9]
Next questions: 'serial_sevens', 'mmse_recall3', 'mmse_world', 'abs_apple_banana', 'prax_clock_num'.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

The invention claimed is:

1. A computer implemented method of adaptively testing a subject's neurological state, the computer implemented method comprising:
monitoring the subject's neurological state by adaptively testing the subject's neurological state multiple times over a period of time to obtain corresponding multiple score values with each of the corresponding multiple score values being indicative of the subject's neurological state, the monitoring comprising performing, for each particular time that the subject's neurological state is tested over the period of time:
presenting, to the subject and via a display, one or more seed questions;
receiving, from the subject and via an input device, answers to the one or more seed questions;
determining, by a processor and using a generalised linear model (GLM) comprising parameters representing difficulty scores and subject ability scores associated with latent subject traits, subject ability scores for the latent subject traits, the determining the subject ability scores comprising determining values of the parameters of the GLM representing the subject ability scores using an expectation maximization (EM) algorithm and the received answers to the one or more seed questions;
iteratively performing an adaptive test loop to obtain a sequence of subject ability scores, each iteration of the adaptive test loop comprising determining subject ability scores for the iteration using the expectation maximization (EM) algorithm, the performing each adaptive test loop comprising performing, as part of an iteration, acts of:

displaying to the subject, via a graphical user interface (GUI), one or more further questions previously selected from a database of questions using previously-obtained subject ability scores, wherein the seed questions and/or the further questions are selected from any one or more of the Alzheimer's Disease Assessment Scale-cognitive test, Alzheimer's Disease Cooperative Study-Activities of Daily Living test, Neuropsychiatric Inventory test, Montgomery-Asberg Depression Rating Scale test, and the Mini-Mental State Examination test;

receiving from the subject, via the GUI, answers to the one or more further questions; and updating the previously-obtained subject ability scores using the EM algorithm to obtain updated subject ability scores; and determining whether a test completion criteria has been met, wherein the adaptive test loop is performed until the test completion criteria has been met;

providing an output of the test based on the updated subject ability scores; and determining a progression of neurodegeneration in the subject based on the obtained updated subject ability scores, and wherein the generalised linear model models a response given by the subject to a question at a particular visit using a Bernoulli GLM having the form:

$$Y_{i,q} \sim \text{Bernoulli}(\alpha + \beta_q \text{cog}_i + \gamma_q \text{dem}_i + \delta_q \text{dep}_i)$$

where, $Y_{i,q}$ is the response given by the subject at a particular visit i, q is the question, $\alpha$ is the intercept, $\beta_q$, $\gamma_q$, and $\delta_q$ are difficulty scores for the questions associated with a cognitive trait, dementia trait, and depression trait respectively, and $\text{cog}_i$, $\text{dem}_i$, and $\text{dep}_i$ are the subject ability score associated with the cognitive trait, dementia trait, and depression trait respectively.

2. The computer implemented method of claim 1, including an initial step of determining a weighting value for each of the latent subject traits.

3. The computer implemented method of claim 2, further comprising selecting the one or more further questions wherein selecting the one or more further questions is further based on the weighting value for at least one of the latent subject traits.

4. The computer implemented method of claim 1, wherein the latent subject traits include one or more of: the cognitive trait, dementia trait, and depression trait.

5. The computer implemented method of claim 1, wherein the determining a progression of neurodegeneration in the subject comprises determining a progression of Alzheimer's disease in the subject.

6. The computer implemented method of claim 1, wherein the determining a progression of neurodegeneration in the subject comprises determining a progression of Dementia in the subject.

7. A device for implementing an adaptive test of a subject's neurological state, comprising:

a processor, a memory, a display, and an input device;

wherein the memory contains processor executable instructions to perform a computer implemented method of adaptively testing the subject's neurological state, the computer implemented method comprising:

monitoring the subject's neurological state by adaptively testing the subject's neurological state multiple times over a period of time to obtain corresponding multiple score values with each of the corresponding multiple score values being indicative of the subject's neurological state, the monitoring comprising performing, for each particular time that the subject's neurological state is tested over the period of time:

presenting, to the subject and via a display, one or more seed questions, wherein the seed questions and/or the further questions are selected from any one or more of the Alzheimer's Disease Assessment Scale-cognitive test, Alzheimer's Disease Cooperative Study—Activities of Daily Living test, Neuropsychiatric Inventory test, Montgomery-Asberg Depression Rating Scale test, and the Mini-Mental State Examination test;

receiving, from the subject and via an input device, answers to the one or more seed questions;

determining, by a processor and using a generalised linear model (GLM) comprising parameters representing difficulty scores and subject ability scores associated with latent subject traits, subject ability scores for the latent subject traits, the determining the subject ability scores comprising determining values of the parameters of the GLM representing the subject ability scores using an expectation maximization (EM) algorithm and the received answers to the one or more seed questions;

iteratively performing an adaptive test loop to obtain a sequence of subject ability scores, each iteration of the adaptive test loop comprising determining subject ability scores for the iteration using the expectation maximization (EM) algorithm, the performing each adaptive test loop comprising performing, as part of an iteration, acts of:

displaying to the subject, via a graphical user interface (GUI), one or more further questions previously selected from a database of questions using previously-obtained subject ability scores;

receiving from the subject, via the GUI, answers to the one or more further questions; and updating the previously-obtained subject ability scores using the EM algorithm to obtain updated subject ability scores; and providing an output of the test based on the updated subject ability scores; and determining a progression of neurodegeneration in the subject based on the obtained updated subject ability scores, and wherein the generalised linear model models a response given by the subject to a question at a particular visit using a Bernoulli GLM having the form:

$$Y_{i,q} \sim \text{Bernoulli}(\alpha + \beta_q \text{cog}_i + \gamma_q \text{dem}_i + \delta_q \text{dep}_i)$$

where, $Y_{i,q}$ is the response given by the subject at a particular visit i, q is the question, $\alpha$ is the intercept, $\beta_q$, $\gamma_q$, and $\delta_q$ are difficulty scores for the questions associated with a cognitive trait, dementia trait, and depression trait respectively, and $\text{cog}_i$, $\text{dem}_i$, and $\text{dep}_i$ are the subject ability score associated with the cognitive trait, dementia trait, and depression trait respectively.

8. The device of claim 7, wherein the computer implemented method includes an initial step of determining a weighting value for each of the latent subject traits.

9. The device of claim 8, wherein the computer implemented method further comprises selecting the one or more further questions and selecting the one or more further questions is further based on the weighting value for at least one of the latent subject traits.

10. The device of claim 7, wherein the latent subject traits include one or more of: the cognitive trait, dementia trait, and depression trait.

11. The device of claim 7, wherein the determining a progression of neurodegeneration in the subject comprises determining a progression of Alzheimer's disease in the subject.

12. The device of claim 7, wherein the determining a progression of neurodegeneration in the subject comprises determining a progression of Dementia in the subject.

13. At least one non-transitory computer-readable storage medium having instructions encoded thereon that, when executed by a processor, causes the processor to perform a computer implemented method for adaptively testing a subject's neurological state, the computer implemented method comprising:

monitoring the subject's neurological state by adaptively testing the subject's neurological state multiple times over a period of time to obtain corresponding multiple score values with each of the corresponding multiple score values being indicative of the subject's neurological state, the monitoring comprising performing, for each particular time that the subject's neurological state is tested over the period of time:
  presenting, to the subject and via a display, one or more seed questions, wherein the seed questions and/or the further questions are selected from any one or more of the Alzheimer's Disease Assessment Scale-cognitive test, Alzheimer's Disease Cooperative Study—Activities of Daily Living test, Neuropsychiatric Inventory test, Montgomery-Asberg Depression Rating Scale test, and the Mini-Mental State Examination test;
  receiving, from the subject and via an input device, answers to the one or more seed questions;
  determining, by a processor and using a generalised linear model (GLM) comprising parameters representing difficulty scores and subject ability scores associated with latent subject traits, subject ability scores for the latent subject traits, the determining the subject ability scores comprising determining values of the parameters of the GLM representing the subject ability scores using an expectation maximization (EM) algorithm and the received answers to the one or more seed questions;
  iteratively performing an adaptive test loop to obtain a sequence of subject ability scores, each iteration of the adaptive test loop comprising determining subject ability scores for the iteration using the expectation maximization (EM) algorithm, the performing each adaptive test loop comprising performing, as part of an iteration, acts of:
    displaying to the subject, via a graphical user interface (GUI), one or more further questions previously selected from a database of questions using previously-obtained subject ability scores;
    receiving from the subject, via the GUI, answers to the one or more further questions; and
    updating the previously-obtained subject ability scores using the EM algorithm to obtain updated subject ability scores; and
  determining whether a test completion criteria has been met;
  wherein the adaptive test loop is performed until the test completion criteria has been met;
  providing an output of the test based on the updated subject ability scores; and
  determining a progression of neurodegeneration in the subject based on the obtained updated subject ability scores, and
  wherein the generalised linear model models a response given by the subject to a question at a particular visit using a Bernoulli GLM having the form:

$$Y_{i,q} \sim \text{Bernoulli}(\alpha + \beta_q \text{cog}_i + \gamma_q \text{dem}_i + \delta_q \text{dep}_i)$$

where, $Y_{i,q}$ is the response given by the subject at a particular visit i, q is the question, a is the intercept, $\beta_q$, $\gamma_q$, and $\delta_q$ are difficulty scores for the questions associated with a cognitive trait, dementia trait, and depression trait respectively, and $\text{cog}_i$, $\text{dem}_i$, and $\text{dep}_i$ are the subject ability score associated with the cognitive trait, dementia trait, and depression trait respectively.

14. The at least one non-transitory computer-readable storage medium of claim 13, wherein the computer implemented method includes an initial step of determining a weighting value for each of the latent subject traits.

15. The at least one non-transitory computer-readable storage medium of claim 14, wherein the computer implemented further comprises selecting the one or more further questions and selecting the one or more further questions is further based on the weighting value for at least one of the latent subject traits.

16. The at least one non-transitory computer-readable storage medium of claim 13, wherein the latent subject traits include one or more of: the cognitive trait, dementia trait, and depression trait.

17. The at least one non-transitory computer-readable storage medium of claim 13, wherein the determining a progression of neurodegeneration in the subject comprises determining a progression of Alzheimer's disease in the subject.

18. The at least one non-transitory computer-readable storage medium of claim 13, wherein the determining a progression of neurodegeneration in the subject comprises determining a progression of Dementia in the subject.

* * * * *